United States Patent
Ohtsuka et al.

(10) Patent No.: US 9,127,681 B2
(45) Date of Patent: *Sep. 8, 2015

(54) CROSS-FLOW FAN, MOLDING DIE, AND FLUID FEEDER

(75) Inventors: Masaki Ohtsuka, Osaka (JP); Yukishige Shiraichi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 744 days.

This patent is subject to a terminal disclaimer.

(21) Appl. No.: 13/394,773

(22) PCT Filed: Sep. 7, 2010

(86) PCT No.: PCT/JP2010/065304
§ 371 (c)(1),
(2), (4) Date: Mar. 7, 2012

(87) PCT Pub. No.: WO2011/030751
PCT Pub. Date: Mar. 17, 2011

(65) Prior Publication Data
US 2012/0171013 A1    Jul. 5, 2012

(30) Foreign Application Priority Data
Sep. 9, 2009  (JP) ................................ 2009-208360

(51) Int. Cl.
*F04D 29/66*     (2006.01)
*F04D 17/04*     (2006.01)
(Continued)

(52) U.S. Cl.
CPC ............. *F04D 17/04* (2013.01); *F04D 29/283* (2013.01); *F04D 29/30* (2013.01); *F04D 29/667* (2013.01); *B29L 2031/087* (2013.01)

(58) Field of Classification Search
USPC .................. 416/223 R, 228, 242, 243, 223 B; 415/206, 53.1, 53.2, 59.1
See application file for complete search history.

(56) References Cited

U.S. PATENT DOCUMENTS 6,769,876 B2 * 8/2004 Sakai et al. .................... 416/187
8,128,359 B2    3/2012 Chen
(Continued)

FOREIGN PATENT DOCUMENTS

CN          1840313 A    10/2006
JP          58-64895 U   5/1983
(Continued)

OTHER PUBLICATIONS

Chinese Office Action for corresponding Chinese Application No. 201080040054.0 mailed Mar. 27, 2014 with an English translation.
(Continued)

*Primary Examiner* — Dwayne J White
*Assistant Examiner* — Justin Seabe
(74) *Attorney, Agent, or Firm* — Birch, Stewart, Kolasch & Birch, LLP

(57) ABSTRACT

A cross-flow fan includes a plurality of fan blades circumferentially spaced from each other. The fan blade has an inner edge portion on the radially inner side, and an outer edge portion on the radially outer side. A blade surface extends between the inner edge portion and the outer edge portion. The blade surface includes a pressure surface on the rotation direction side of the fan and a suction surface on the opposite side. In cross-section orthogonal to the rotation axis of the fan, the fan blade has a concave portions formed at the pressure surface and the suction surface. A plurality of concave portions are formed at pressure surface. Side fan provides excellent blowing capacity. Also disclosed are a molding die for use in production of the cross-flow fan, and a fluid feeder provided with the cross-flow fan.

12 Claims, 12 Drawing Sheets

(51) Int. Cl.
*F04D 29/28* (2006.01)
*F04D 29/30* (2006.01)
*B29L 31/08* (2006.01)

(56) References Cited

U.S. PATENT DOCUMENTS

| | | | |
|---|---|---|---|
| 2006/0177304 | A1 | 8/2006 | Omori et al. |
| 2009/0028719 | A1* | 1/2009 | Teraoka et al. ........... 416/223 R |
| 2010/0186357 | A1 | 7/2010 | Takeda et al. |

FOREIGN PATENT DOCUMENTS

| | | | |
|---|---|---|---|
| JP | 59-62293 | U | 4/1984 |
| JP | 63-31295 | U | 2/1988 |
| JP | 3-143620 | A | 6/1991 |
| JP | 5-106591 | A | 4/1993 |
| JP | 7-4388 | A | 1/1995 |
| JP | 8-247093 | A | 9/1996 |
| JP | 9-280196 | A | 10/1997 |
| JP | 2005-16315 | A | 1/2005 |
| JP | 2007-10259 | A | 1/2007 |
| JP | 2007-21352 | A | 2/2007 |
| JP | 2009-28681 | A | 2/2009 |

OTHER PUBLICATIONS

International Search Report (Form PCT/ISA/210), dated Dec. 21, 2010, for International Application No. PCT/JP2010/065303.

International Search Report (Form PCT/ISA/210), dated Dec. 21, 2010, for International Application No. PCT/JP2010/065304, with an English translation.

U.S. Office Action, dated Dec. 19, 2014, for U.S. Appl. No. 13/395,017.

Final Office Action for Co-Pending U.S. Appl. No. 13/395,017 mailed Apr. 23, 2015.

* cited by examiner

CROSS-FLOW FAN, MOLDING DIE, AND FLUID FEEDER

TECHNICAL FIELD

The present invention relates to a cross-flow fan, a molding die, and a fluid feeder, and particularly to a cross-flow fan for an air conditioner and an air purifier, a molding die for use in production of the cross-flow fan, and a fluid feeder provided with the cross-flow fan.

BACKGROUND ART

As for conventional cross-flow fans, for example, Japanese Patent Laying-Open No. 2007-21352 discloses an air purifier which aims to reduce the installation area while increasing the blowing capacity (PTL 1). In the air purifier disclosed in PTL 1, a vertically long cross-flow fan driven by a motor is arranged in a body having an intake and an outlet at left and right ends, respectively.

CITATION LIST

Patent Literature

PTL 1: Japanese Patent Laying-Open No. 2007-21352

SUMMARY OF INVENTION

Technical Problem

In recent years, for conservation of global environment, further energy savings in home electric equipment are desired. For example, it is known that the efficiency of electric equipment such as an air conditioner and an air purifier greatly depends on the efficiency of a blower included therein. It is also known that reducing the weight of a fan blade provided as a rotating body in a blower reduces power consumption of a motor for rotatably driving the fan blade and improves the efficiency of the blower or a fluid feeder.

However, an aerofoil employed as the shape in cross section of a fan blade is essentially assumed to be applied to the wing of an air plane and is mainly found in the field of aeronautical engineering. Therefore, an aerofoil fan blade is mainly optimized in a high Reynolds number region and is not always appropriate as the cross section of a fan blade used in a low Reynolds number region for an air conditioner, an air purifier, etc. for home use.

When an aerofoil or double arc is employed as the cross-sectional shape of a fan blade, a thick portion exists in a range of 30 to 50% from the front edge of the fan blade. This increases the weight of the fan blade, which becomes a cause of increased friction loss during rotation. However, simply reducing the weight of a fan blade may reduce the strength of the fan blade and result in fracture or other poor quality.

For the reasons above, in order to save energy in electric equipment such as an air conditioner and an air purifier for home use, an appropriate blade cross-sectional shape has been sought for a fan blade to be used in the low Reynolds number region. A blade cross-sectional shape with a high lift-drag ratio, a small thickness and weight, and a high strength has also been sought.

Fans for use in an air blower include a cross-flow fan that forms an outlet flow in the form of a flat plane parallel to the rotation axis of the fan. Examples of typical application of the cross-flow fan include an air conditioner. Reducing power consumption of an air conditioner is a high priority when more energy savings in home electric equipment are desired. There is a demand to increase air flow rate for the purpose of reducing power consumption of the air conditioner. The increase of air flow rate can increase the performance of evaporation and condensation of a heat exchanger and can reduce power consumption of a compressor, accordingly. However, the increase of air flow rate increases power consumption of the fan. Therefore, the balance between the reduction of power consumption in the compressor and the increase of power consumption in the fan amounts to a reduction of power consumption. Thus, the effect achieved by increasing the air flow rate of the fan cannot be maximized. On the other hand, if the rotation speed is increased with the same fan, as a means for increasing the air flow rate of the fan, the noise of the air conditioner is increased.

Another example of application of the cross-flow fan is an air purifier. An air purifier is requested to increase its dust-collecting capacity, that is, to increase the air flow rate, and to reduce noise. However, there is a tradeoff between these two requests.

In order to satisfy these two, it is necessary not only to reduce noise from the intake and the outlet of the air purifier but also to fundamentally reduce noise of the cross-flow fan that blows air. In order to increase the air flow rate, it is necessary to increase the rotation speed of the cross-flow fan. When the rotation speed of the cross-flow fan is increased, it is necessary to reduce input to the fan. It is also necessary to increase the strength of the fan blade to such an extent as to overcome the increased centrifugal force caused by the increased rotation speed of the cross-flow fan.

An object of the present invention is therefore to solve the aforementioned problems and to provide a cross-flow fan exhibiting an excellent blowing capacity, a molding die for use in production of the cross-flow fan, and a fluid feeder provided with the cross-flow fan.

Solution to Problem

A cross-flow fan according to the present invention includes a plurality of vane portions provided to be circumferentially spaced apart from each other. The vane portion has an inner edge portion arranged on a radially inner side to/from which air flows in/out and an outer edge portion arranged on a radially outer side to/from which air flows in/out. The vane portion has a blade surface extending between the inner edge portion and the outer edge portion. The blade surface includes a pressure surface arranged on a rotation direction side of the cross-flow fan and a suction surface arranged on a back side of the pressure surface. The vane portion has such a blade cross-sectional shape that a concave portion is formed at the pressure surface and the suction surface when the vane portion is cut along a plane orthogonal to a rotation axis of the cross-flow fan. A plurality of concave portions are formed at at least one of the pressure surface and the suction surface.

In the cross-flow fan configured in this manner, during rotation of the cross-flow fan, an air flow that flows in from the outer edge portion, passes through the blade surface, and flows out from the inner edge portion and an air flow that flows in from the inner edge portion, passes through the blade surface, and flows out from the outer edge portion are alternately produced in each vane portion. Here, a vortex of air flow (secondary flow) is generated in the concave portion, so that the air flow (main flow) passing through the blade surface flows along the outside of the vortex produced in the concave portion. Accordingly, the vane portion exhibits a behavior like a thick blade as if a blade cross sectional shape is increased in thickness by the amount of formation of the vortex. As a result, the blowing capacity of the cross-flow fan can be improved.

Preferably, the vane portion has a flection portion formed by flexing a center line of the blade cross-sectional shape extending between the inner edge portion and the outer edge portion, at a plurality of points. The concave portion is formed by the flection portion. In the cross-flow fan configured in this manner, a vortex of air flow is generated in the concave portion formed by the flection portion, thereby improving the blowing capacity of the cross-flow fan.

Preferably, the flection portion is flexed such that a depth of the concave portion is larger than a thickness of the vane portion at at least one point. In the cross-flow fan configured in this manner, a vortex of air flow can be generated in the concave portion more reliably.

Preferably, the concave portion is formed in the proximity of the inner edge portion and the outer edge portion. In the cross-flow fan configured in this manner, the above-noted effect achieved by the concave portion is brought about in the proximity of the inner edge portion and the outer edge portion, thereby generating a high lift. In addition, the formation of the flection portion can improve the strength of the vane portion in the proximity of the inner edge portion.

Preferably, the concave portion is formed at a blade central portion between the inner edge portion and the outer edge portion. In the cross-flow fan configured in this manner, the above-noted effect achieved by the concave portion is brought about in the blade central portion, so that the vane portion exhibits a stable ability as a blade. In addition, the formation of the flection portion can improve the strength of the vane portion at the blade central portion.

Preferably, the concave portion is formed to extend from one end to the other end of the blade surface in a rotation axis direction of the cross-flow fan. In the cross-flow fan configured in this manner, a vortex of air flow is generated in the concave portion formed to extend from one end to the other end of the blade surface in the rotation axis direction of the cross-flow fan, thereby improving the blowing capacity of the cross-flow fan more effectively.

Preferably, the concave portion is formed at the pressure surface and the suction surface to repeatedly appear in a direction in which the inner edge portion is connected with the outer edge portion. In the cross-flow fan configured in this manner, a vortex of air flow is generated in the concave portion which repeatedly appears at the pressure surface and the suction surface, thereby improving the blowing capacity of the cross-flow fan more effectively.

Preferably, the concave portion formed at the pressure surface forms a convex portion at the suction surface, and the concave portion formed at the suction surface forms a convex portion at the pressure surface. In the cross-flow fan configured in this manner, a blade cross-sectional shape having a concave portion at the pressure surface and at the suction surface can be easily obtained.

Preferably, in the blade cross-sectional shape, the concave portion is formed between convex portions appearing at the blade surface. The concave portion and the convex portions are formed to be alternately aligned in a direction in which the inner edge portion is connected with the outer edge portion. In the cross-flow fan configured in this manner, a vortex of air flow is generated in the concave portion formed between the convex portions, thereby improving the blowing capacity more effectively.

Preferably, the vane portion has the blade cross-sectional shape having a generally constant thickness between the inner edge portion and the outer edge portion. In the cross-flow fan configured in this manner, even when a vane portion having a blade cross-sectional shape having a generally constant thickness is used, the blowing capacity can be improved.

Preferably, the blade cross-sectional shape is approximately W-shaped. In the cross-flow fan configured in this manner, a vortex of air flow is generated in the concave portion appearing in the blade cross-sectional shape, thereby improving the blowing capacity of the cross-flow fan.

Preferably, the cross-flow fan is formed from resin. In the cross-flow fan configured in this manner, a light and high-strength cross-flow fan made of resin can be obtained.

A molding die according to the present invention is used to mold the cross-flow fan as described above. With the molding die configured in this manner, a light and high-strength cross-flow fan made of resin can be manufactured.

A fluid feeder according to the present invention includes a blower configured to include any of the cross-flow fan as described above and a driving motor coupled to the cross-flow fan to rotate a plurality of vane portions. In the fluid feeder configured in this manner, power consumption of the driving motor can be reduced while the blowing capacity is kept high.

Advantageous Effects of Invention

As described above, the present invention provides a cross-flow fan exhibiting an excellent blowing capacity, a molding die for use in production of the cross-flow fan, and a fluid feeder provided with the cross-flow fan.

DESCRIPTION OF EMBODIMENTS

Figure 1:
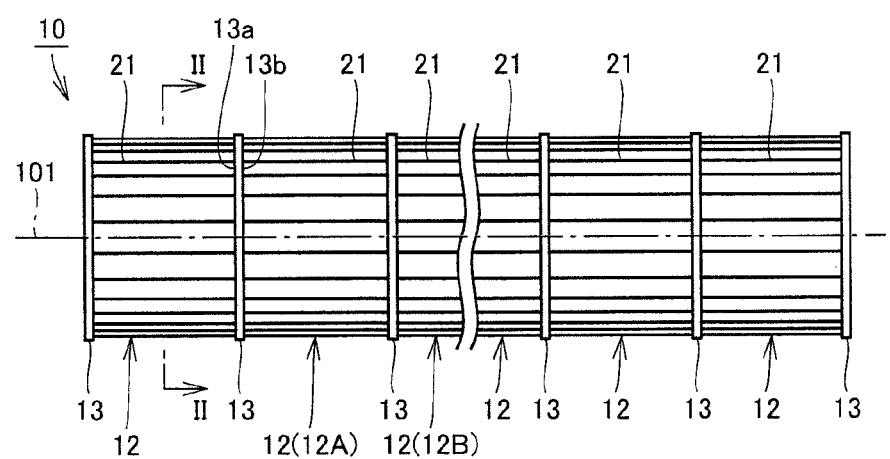
FIG. 1 is a side view of a cross-flow fan in a first embodiment of the present invention.

Embodiments of the present invention will be described with reference to the figures. In the following, the same or corresponding members in the figures are denoted with the same reference numerals.

First Embodiment

Figure 2:
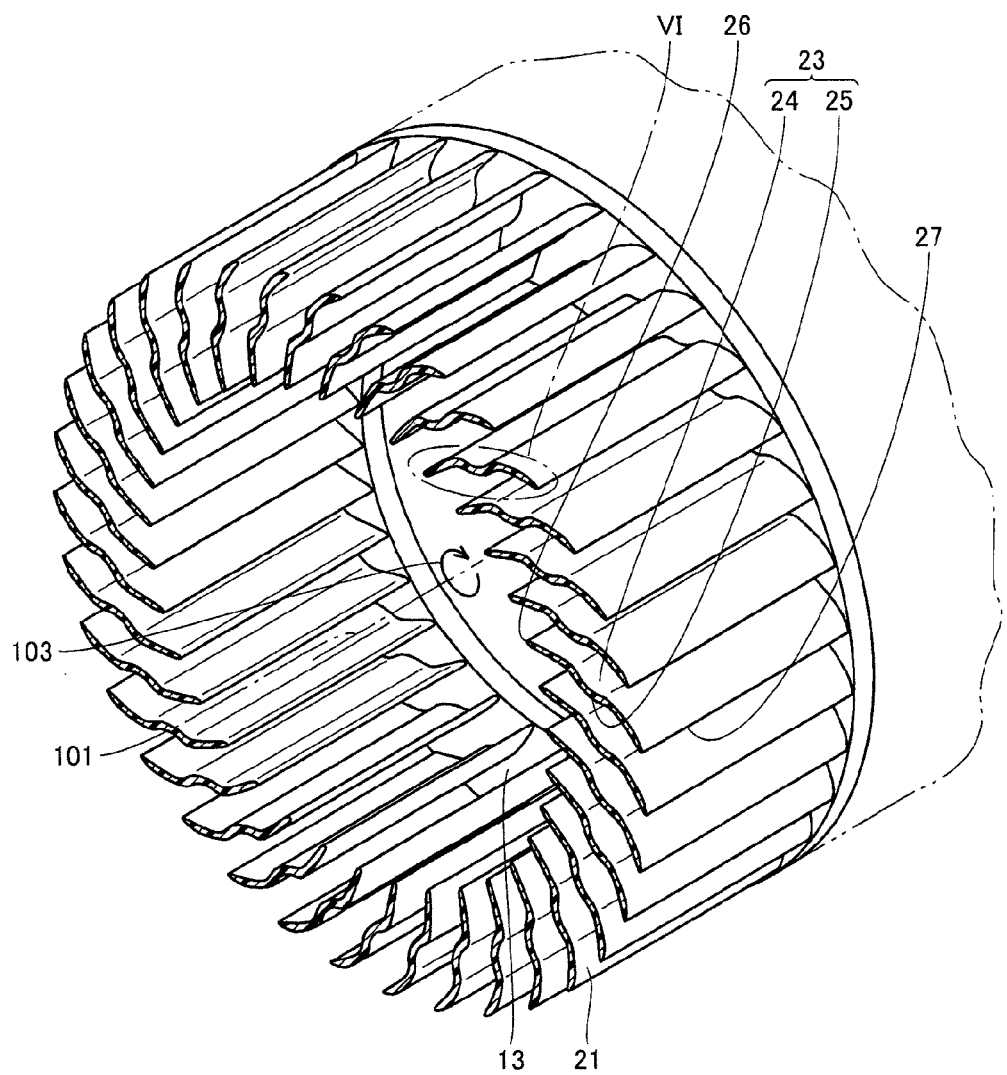
FIG. 2 is a cross-sectional perspective view of the cross-flow fan taken along a line II-II in FIG. 1.

FIG. 1 is a side view of a cross-flow fan in a first embodiment of the present invention. FIG. 2 is a cross-sectional perspective view of the cross-flow fan taken along a line II-II in FIG. 1.

Referring to FIG. 1 and FIG. 2, a cross-flow fan 10 in the present embodiment has a plurality of fan blades 21. Cross-flow fan 10 has an approximately cylindrical appearance as a whole. A plurality of fan blades 21 are arranged on a side surface of the approximately cylindrical shape. Cross-flow fan 10 is integrally formed from resin. Cross-flow fan 10 rotates in the direction shown by an arrow 103 around an imaginary center axis 101 shown in the figures.

Cross-flow fan 10 is a fan using a plurality of rotating fan blades 21 to flow air in a direction orthogonal to center axis 101 serving as the rotation axis. As viewed from the axial direction of center axis 101, cross-flow fan 10 takes in air from an outside space on one side with respect to center axis 101 to an inside space of the fan and blows the taken-in air to the outside space on the other side with respect to center axis 101. Cross-flow fan 10 forms an air flow that flows in the direction crossing center axis 101 in a flat plane orthogonal to center axis 101. Cross-flow fan 10 forms an outlet flow in the form of a flat plane parallel to center axis 101.

Cross-flow fan 10 is used with the rotation speeds in the low Reynolds number region applied to a fan for home electric equipment, etc.

Cross-flow fan 10 is configured such that a plurality of impellers 12 aligned in the axial direction of center axis 101 are combined. In each impeller 12, a plurality of fan blades 21 are provided to be circumferentially spaced apart from each other around center axis 101.

Cross-flow fan 10 further has a peripheral frame 13 serving as a support. Peripheral frame 13 has a ring shape annularly extending around center axis 101. Peripheral frame 13 has an end surface 13a and an end surface 13b. End surface 13a is formed to face one direction along the axial direction of center axis 101. End surface 13b is arranged on the back side of end surface 13a and is formed to face the other direction along the axial direction of center axis 101.

Peripheral frame 13 is provided to be interposed between impellers 12 adjacent to each other in the axial direction of center axis 101.

With attention given to impeller 12A and impeller 12B in FIG. 1 arranged adjacent to each other, a plurality of fan blades 21 provided in impeller 12A are provided to stand on end surface 13a and are formed to extend like a plate along the axial direction of center axis 101. A plurality of fan blades 21 provided in impeller 12B are provided to stand on end surface 13b and are formed to extend like a plate along the axial direction of center axis 101.

A plurality of fan blades 21 have a shape equal to each other. In the present embodiment, a plurality of fan blades 21 are arranged at a random pitch in the circumferential direction around center axis 101.

Fan blade 21 has an inner edge portion 26 and an outer edge portion 27. Inner edge portion 26 is arranged on an end portion at a radially inner side of fan blade 21. Outer edge portion 27 is arranged at an end portion at a radially outer side of fan blade 21. Fan blade 21 is formed to be inclined in the circumferential direction around center axis 101 from inner edge portion 26 toward outer edge portion 27. Fan blade 21 is formed to be inclined in the rotation direction of cross-flow fan 10 from inner edge portion 26 toward outer edge portion 27.

Fan blade 21 has a blade surface 23 including a pressure surface 25 and a suction surface 24. Pressure surface 25 is arranged on the rotational direction side of cross-flow fan 10. Suction surface 24 is arranged on the back side of pressure surface 25. During rotation of cross-flow fan 10, as an air flow is produced on blade surface 23, a pressure distribution is generated such that pressure is relatively large at pressure surface 25 and is relatively small at suction surface 24. Fan blade 21 has a shape generally curved between inner edge portion 26 and outer edge portion 27 so as to be concave on the pressure surface 25 side and be convex on the suction surface 24 side.

Figure 3:
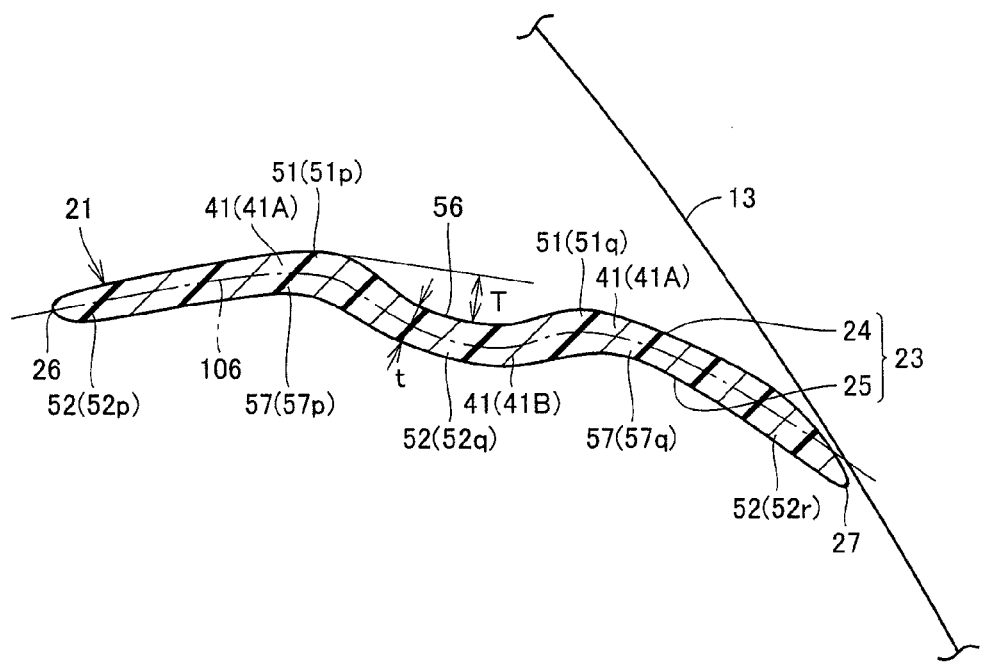
FIG. 3 is a cross-sectional view of a fan blade provided in the cross-flow fan in FIG. 1.

FIG. 3 is a cross-sectional view of the fan blade provided in the cross-flow fan in FIG. 1. FIG. 3 shows a blade cross-sectional shape of fan blade 21 when it is cut along a plane orthogonal to center axis 101 serving as the rotation axis of cross-flow fan 10.

Referring to FIG. 1 to FIG. 3, fan blade 21 is formed to have the same blade cross-sectional shape when it is cut at any place in the axial direction of center axis 101. Fan blade 21 is formed to have a thin blade cross-sectional shape. Fan blade 21 is formed to have a generally constant thickness (the length between pressure surface 25 and suction surface 24) between inner edge portion 26 and outer edge portion 27.

Fan blade 21 has such a blade cross-sectional shape that concave portions 57 are formed at pressure surface 25 of blade surface 23 and a concave portion 56 is formed at suction surface 24 of blade surface 23. A plurality of concave portions 56, 57 are formed at at least one of pressure surface 25 and suction surface 24.

In the present embodiment, a plurality of concave portions 57 (concave portions 57p, 57q) are formed at pressure surface 25. Convex portions 52 (52p, 52q, 52r) are further formed at pressure surface 25. Convex portion 52 is formed to protrude toward the rotation direction of cross-flow fan 10. Concave portion 57 is formed by a valley portion between convex portions 52 arranged adjacent to each other. For example, concave portion 57p is formed by a valley portion between convex portion 52p and convex portion 52q. Concave portions 57 and convex portions 52 are formed to be alternately aligned in the direction in which inner edge portion 26 is connected with outer edge portion 27. Concave portion 57 has an approximately U-shaped cross-sectional shape.

A plurality of convex portions 51 (convex portions 51p, 51q) are further formed at suction surface 24. Convex portion 51 is formed to protrude toward the direction opposite to the rotation direction of cross-flow fan 10. Concave portion 56 is formed by a valley portion between convex portions 51 arranged adjacent to each other. In the present embodiment, concave portion 56 is formed by a valley portion between convex portion 51p and convex portion 51q. Concave portion 56 and convex portions 51 are formed to be alternately aligned in the direction in which inner edge portion 26 is connected with outer edge portion 27. Concave portion 56 has an approximately U-shaped cross-sectional shape.

Concave portion 57 and convex portion 51 are formed at front and back corresponding positions of pressure surface 25 and suction surface 24, respectively. Convex portion 52 and concave portion 56 are formed at front and back corresponding positions of pressure surface 25 and suction surface 24, respectively. In the present embodiment, concave portion 57 formed at pressure surface 25 forms convex portion 51 at suction surface 24, and concave portion 56 formed at suction surface 24 forms convex portion 52 at pressure surface 25. The concave portion and the convex portion formed at the front and the back correspondingly at pressure surface 25 and suction surface 24 have a cross-sectional shape equal to each other.

Concave portions 57, 56 are each shaped like a groove extending along the axial direction of center axis 101. The groove portion formed of each concave portion 57, 56 is formed to continuously extend between one end and the other end of fan blade 21 in the axial direction of center axis 101. The groove portion formed of each concave portion 57, 56 is formed to linearly extend between one end and the other end of fan blade 21 in the axial direction of center axis 101.

In the present embodiment, the number of concave portions 57 formed at pressure surface 25 is greater than the number of concave portion 56 formed at suction surface 24.

FIG. 3 shows a center line 106 in the thickness direction (the direction in which pressure surface 25 is connected with suction surface 24) of the blade cross-sectional shape of fan blade 21. Fan blade 21 has flection portions 41 at which center line 106 of the blade cross-sectional shape of fan blade 21 is flexed at a plurality of points between inner edge portion 26 and outer edge portion 27. Concave portions 56, 57 are formed by flection portions 41.

In the present embodiment, fan blade 21 has flection portions 41 at three points between inner edge portion 26 and outer edge portion 27. Fan blade 21 has flection portions 41A arranged in the proximity of inner edge portion 26 and outer edge portion 27, respectively, and a flection portion 41B arranged at a blade central potion between inner edge portion 26 and outer edge portion 27. Flection portion 41A forms concave portion 57 at pressure surface 25 and forms convex portion 51 at suction surface 24. Flection portion 41B forms convex portion 52 at pressure surface 25 and forms concave portion 56 at suction surface 24.

With such a configuration, concave portions 57 are formed in the proximity of inner edge portion 26 and outer edge portion 27, and concave portion 56 is formed at the blade central portion between inner edge portion 26 and outer edge portion 27. Fan blade 21 has an approximately W-shaped blade cross-sectional shape.

Flection portions 41 are flexed such that the depth T of concave portions 56, 57 is greater than the thickness t of fan blade 21 at at least one point. Flection portions 41 are formed such that the bending direction is alternately opposite in the direction in which inner edge portion 26 is connected with outer edge portion 27. Flection portion 41 is formed to be bent in a rounded shape. Flection portion 41 may be formed to be bent to form a corner.

The structure of cross-flow fan 10 in the first embodiment of the present invention as described above is summarized as follows. Cross-flow fan 10 in the present embodiment includes a plurality of fan blades 21 as vane portions provided to be circumferentially spaced apart from each other. Fan blade 21 has inner edge portion 26 arranged on the radially inner side to/from which air flows in/out and outer edge portion 27 arranged on the radially outer side to/from which air flows in/out. Fan blade 21 has blade surface 23 extending between inner edge portion 26 and outer edge portion 27. Blade surface 23 includes pressure surface 25 arranged on the rotation direction side of cross-flow fan 10 and suction surface 24 arranged on the back side of pressure surface 25. When cut along the plane orthogonal to center axis 101 serving as the rotation axis of cross-flow fan 10, fan blade 21 has such a blade cross-sectional shape that concave portions 57, 56 are formed at pressure surface 25 and suction surface 24. A plurality of concave portions 57 (57p, 57q) are formed at pressure surface 25 as at least one of pressure surface 25 and suction surface 24.

A structure of an air conditioner using cross-flow fan 10 in FIG. 1 will now be described.

Figure 4:
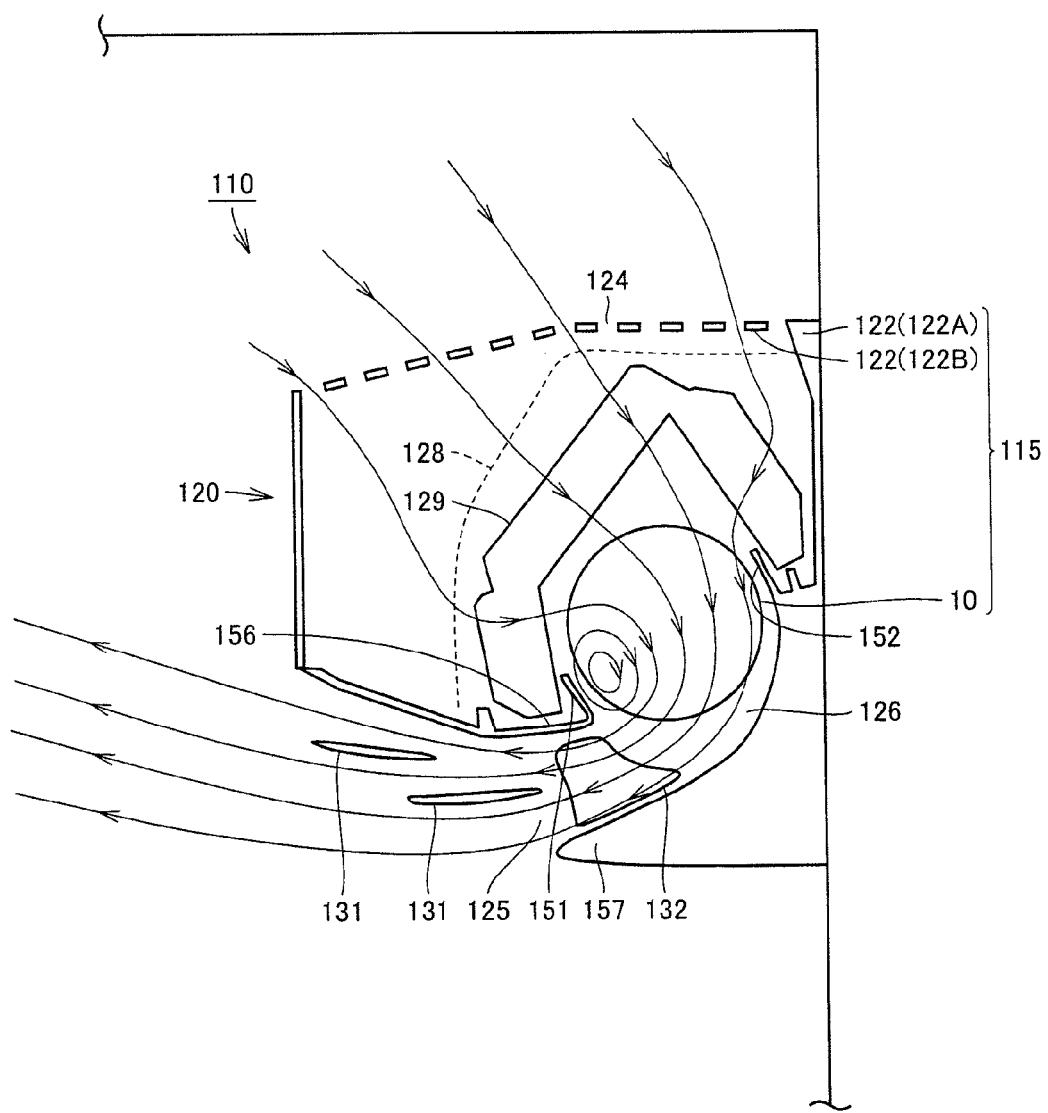
FIG. 4 is a cross-sectional view of an air conditioner using the cross-flow fan shown in FIG. 1.

FIG. 4 is a cross-sectional view of an air conditioner using the cross-flow fan shown in FIG. 1. Referring to FIG. 4, an air conditioner 110 is configured with an indoor unit 120 installed in a room and provided with an indoor heat exchanger 129 and a not-shown outdoor unit installed in the outside of the room and provided with an outdoor heat exchanger and a compressor. Indoor unit 120 and the outdoor unit are connected by piping for circulating refrigerant gas between indoor heat exchanger 129 and the outdoor heat exchanger.

Indoor unit 120 has a blower 115. Blower 115 is configured to include cross-flow fan 10, a not-shown driving motor for rotating cross-flow fan 10, and a casing 122 for producing a prescribed airflow with rotation of cross-flow fan 10.

Casing 122 has a cabinet 122A and a front panel 122B. Cabinet 122A is supported on a wall surface in the room. Front panel 122B is removably attached to cabinet 122A. An outlet port 125 is formed in a gap between a lower end portion of front panel 122B and a lower end portion of cabinet 122A. Outlet port 125 is formed in an approximately rectangular shape extending in the width direction of indoor unit 120 and is provided to be directed forward and downward. On the top surface of front panel 122B, a grid-like intake port 124 is formed.

At a position opposing front panel 122B, an air filter 128 is provided for collecting and removing dust included in the air taken in from intake port 124. A not-shown air filter cleaner is provided in a space formed between front panel 122B and air filter 128. The air filter cleaner automatically removes dust accumulated in air filter 128.

In the inside of casing 122, an air flow channel 126 is formed, through which air is circulated from intake port 124 toward outlet port 125. Outlet portion 125 is provided with a vertical louver 132 that can change the blowing angle in the left and right directions and a plurality of horizontal louvers 131 that can change the blowing angle in the up and down directions to a forward-upward direction, a horizontal direction, a forward-downward direction, and an immediately downward direction.

Indoor heat exchanger 129 is arranged between cross-flow fan 10 and air filter 128 on a path of air flow channel 126. Indoor heat exchanger 129 has not-shown serpentine refrigerant pipes arranged side by side in a plurality of layers in the up and down directions and in a plurality of columns in the front and back directions. Indoor heat exchanger 129 is connected to the compressor of the outdoor unit installed in the outdoor, and the compressor is driven to operate a refrigeration cycle. Through the operation of the refrigeration cycle, indoor heat exchanger 129 is cooled to a temperature lower than the ambient temperature during cooling operation, and indoor heat exchanger 129 is heated to a temperature higher than the ambient temperature during heating operation.

Figure 5:
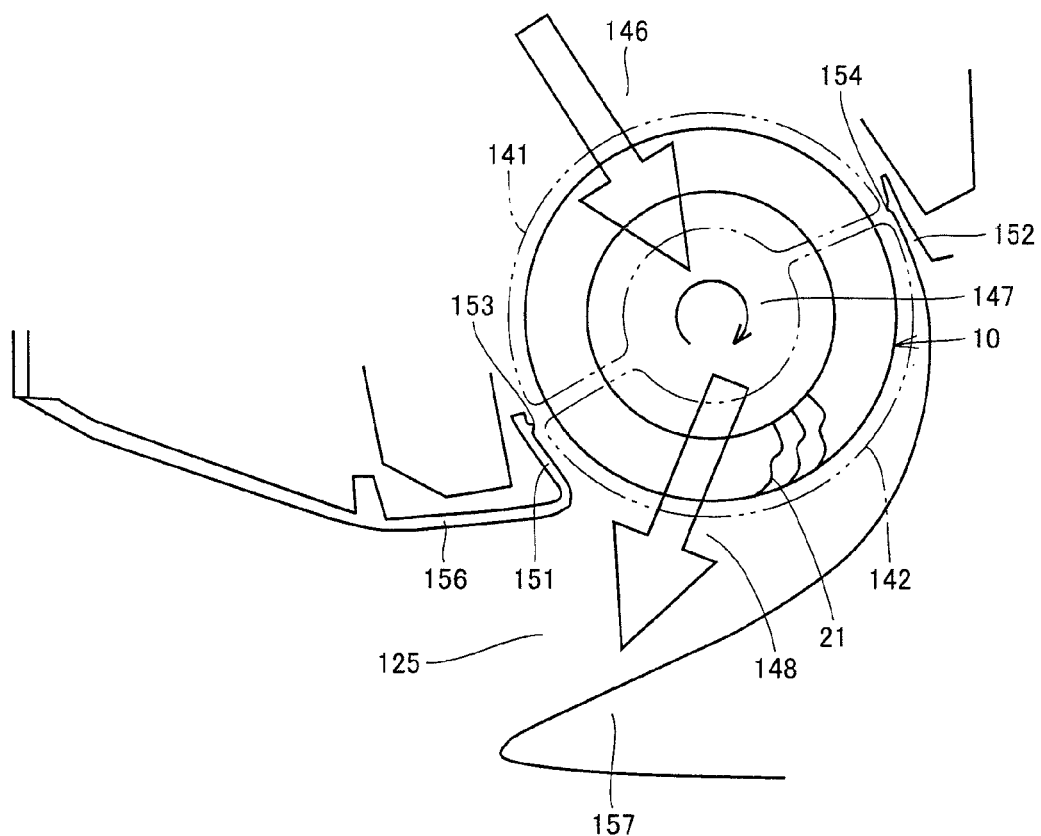
FIG. 5 is an enlarged cross-sectional view showing the proximity of an outlet port of the air conditioner in FIG. 4.

FIG. 5 is an enlarged cross-sectional view showing the proximity of the outlet port of the air conditioner in FIG. 4. Referring to FIG. 4 and FIG. 5, casing 122 has a front wall portion 151 and a rear wall portion 152. Front wall portion 151 and rear wall portion 152 are arranged to face each other at a distance from each other.

On a path of air flow channel 126, cross-flow fan 10 is arranged to be positioned between front wall portion 151 and rear wall portion 152. A protrusion portion 153 is formed at front wall portion 151 to protrude toward the radially outer surface of cross-flow fan 10 so as to decrease the gap between cross-flow fan 10 and front wall portion 151. A protrusion portion 154 is formed at rear wall portion 152 to protrude toward the radially outer surface of cross-flow fan 10 so as to decrease the gap between cross-flow fan 10 and rear wall portion 152.

Casing 122 has an upper guide portion 156 and a lower guide portion 157. Air flow channel 126 is defined by upper guide portion 156 and lower guide portion 157 on the downstream side of air flow from cross-flow fan 10.

Upper guide portion 156 and lower guide portion 157 are continuous from front wall portion 151 and rear wall portion 152, respectively, and extend toward outlet port 125. Upper guide portion 156 and lower guide portion 157 are formed to curve the air blown by cross-flow fan 10 such that upper guide portion 156 is the inner circumferential side and lower guide portion 157 is the outer circumferential side, and to guide the air forward and downward. Upper guide portion 156 and lower guide portion 157 are formed such that the cross section of air flow channel 126 increases from cross-flow fan 10 toward outlet port 125.

In the present embodiment, front wall portion 151 and upper guide portion 156 are integrally formed with front panel 122B. Rear wall portion 152 and lower guide portion 157 are integrally formed with cabinet 122A.

Figure 6:
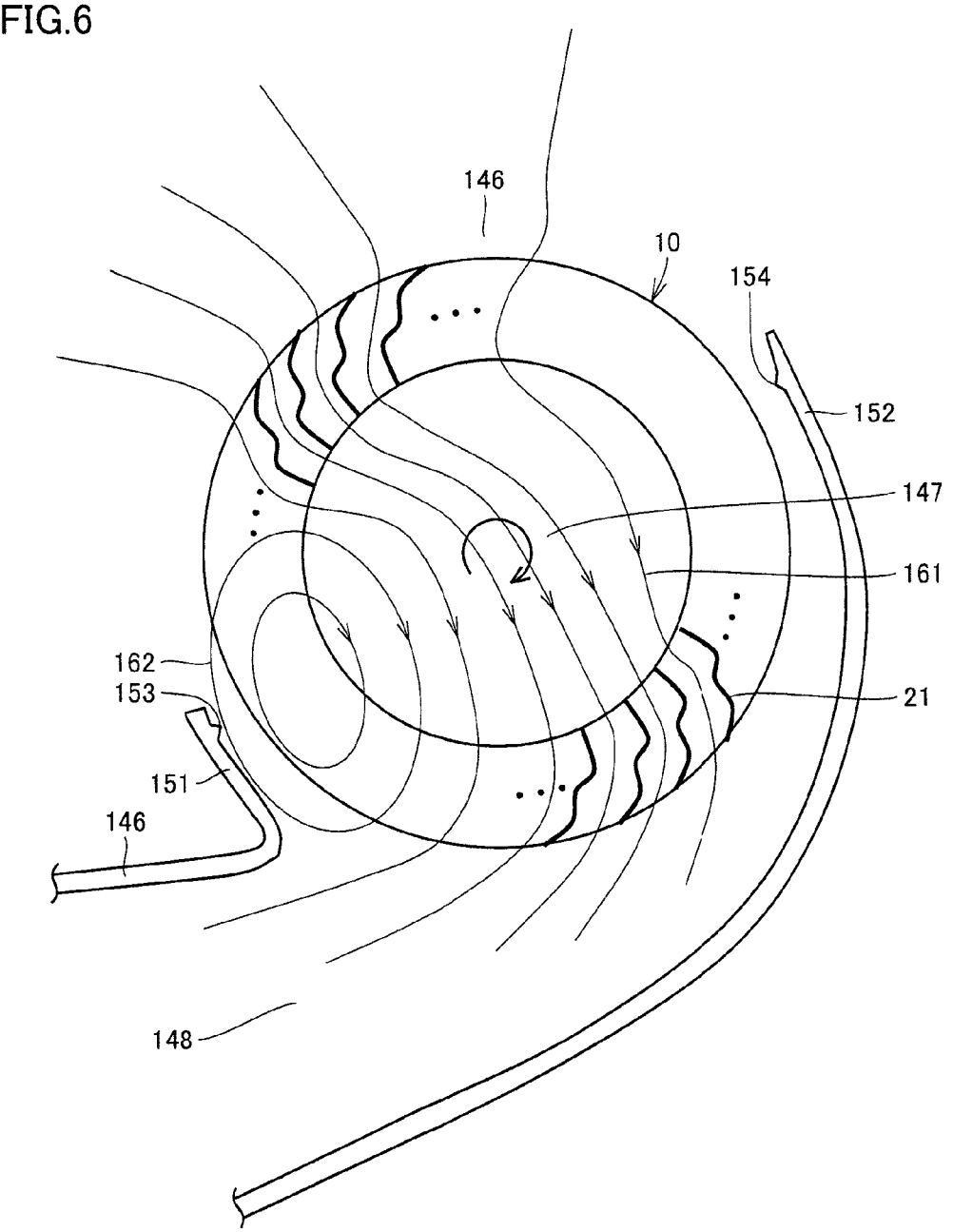
FIG. 6 is a cross-sectional view of an air flow produced in the proximity of the outlet port of the air conditioner in FIG. 4.

FIG. 6 is a cross-sectional view of an air flow produced in the proximity of the outlet port of the air conditioner in FIG. 4. Referring to FIG. 5 and FIG. 6, on the path on air flow channel 126, an upstream outside space 146 is formed to be positioned upstream of air flow from cross-flow fan 10, an inside space 147 is formed to be positioned in the inside of cross-flow fan 10 (the radially inner side of a plurality of fan blades 21 circumferentially arranged), and a downstream outside space 148 is formed to be positioned downstream of air flow from cross-flow fan 10.

During rotation of cross-flow fan 10, at an upstream region 141 of air flow channel 126 with respect to protrusion portions 153, 154 as a boundary, an air flow 161 is formed to pass through on blade surface 23 of fan blade 21 from upstream outside space 146 toward inside space 147. At a downstream region 142 of air flow channel 126 with respect to protrusion portions 153, 154 as a boundary, air flow 161 is formed to pass through on blade surface 23 from inside space 147 toward downstream outside space 148. Here, at a position adjacent to front wall portion 151, a vortex 162 of air flow is formed.

Figure 7:
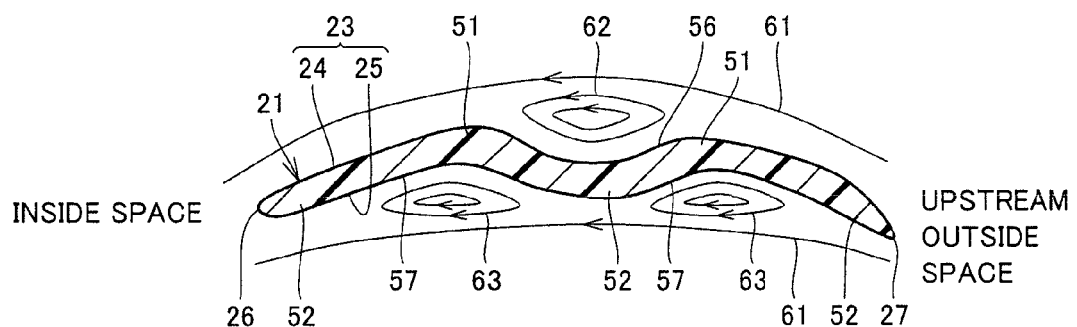
FIG. 7 is a cross-sectional view representing a phenomenon that occurs on a blade surface of the fan blade in an upstream region shown in FIG. 5.
Figure 8:
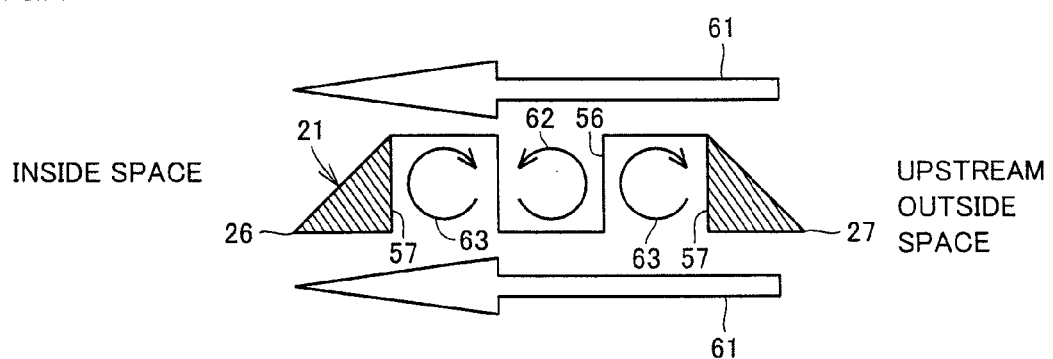
FIG. 8 is a diagram schematically representing the fan blade shown in FIG. 7.

FIG. 7 is a cross-sectional view representing a phenomenon that occurs on the blade surface of the fan blade in the upstream region shown in FIG. 5. FIG. 8 is a diagram schematically representing the fan blade shown in FIG. 7.

Referring to FIG. 7 and FIG. 8, when an air flow directed from upstream outside space 146 toward inside space 147 is formed at upstream region 141, an air flow is produced on blade surface 23 of fan blade 21 to flow in from outer edge portion 27, pass through on blade surface 23, and flow out from inner edge portion 26. Here, a clockwise vortex 63 of air flow (secondary flow) is formed in concave portion 57 formed at pressure surface 25, and a counterclockwise vortex 62 of air flow is generated at concave portion 56 formed at suction surface 24. Accordingly, an air flow 61 (main flow) passing through on blade surface 23 flows along the outside of vortexes 63, 62 produced at concave portions 57, 56.

Figure 9:
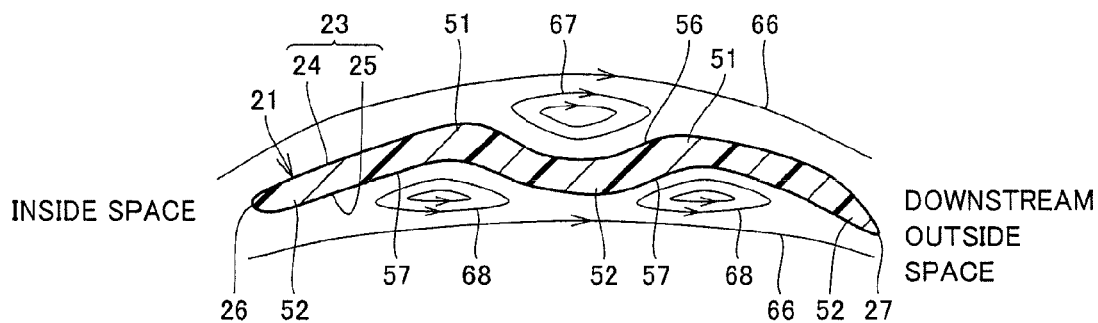
FIG. 9 is a cross-sectional view representing a phenomenon that occurs on the blade surface of the fan blade in a downstream region shown in FIG. 5.
Figure 10:
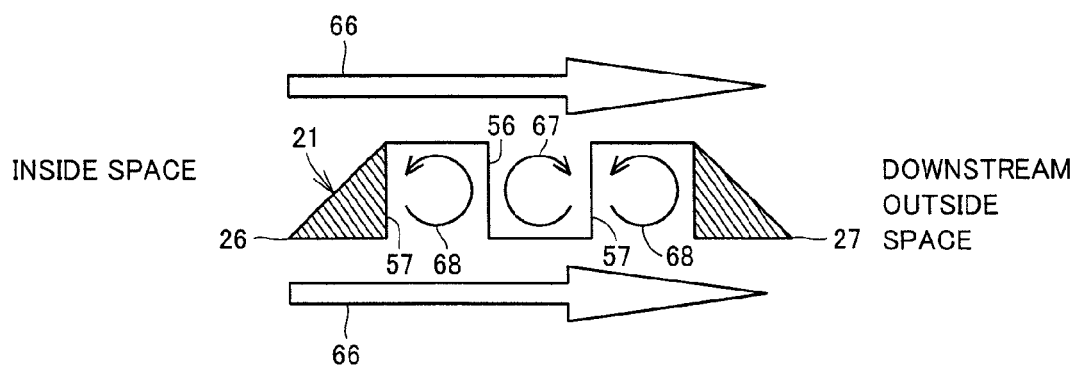
FIG. 10 is a diagram schematically representing the fan blade shown in FIG. 9.

FIG. 9 is a cross-sectional view representing a phenomenon that occurs on the blade surface of the fan blade in the downstream region shown in FIG. 5. FIG. 10 is a diagram schematically representing the fan blade shown in FIG. 9.

Referring to FIG. 9 and FIG. 10, when an air flow directed from inside space 147 toward downstream outside space 148 is formed in downstream region 142, an air flow is produced on blade surface 23 of fan blade 21 to flow in from inner edge portion 26, pass through on blade surface 23, and flow out from outer edge portion 27. Here, a counterclockwise vortex 68 of air flow (secondary flow) is formed at concave portion 57 formed at pressure surface 25, and a clockwise vortex 67 of air flow is generated at concave portion 56 formed at suction surface 24. Accordingly, an air flow 66 (main flow) passing through on blade surface 23 flows along the outside of vortexes 68, 67 produced at concave portions 57, 56.

In other words, in cross-flow fan 10, when fan blade 21 moves from upstream region 141 to downstream region 142, the direction of air flow on blade surface 23 is reversed, and the rotation directions of the vortexes produced at concave portions 57, 56 are reversed accordingly.

In cross-flow fan 10 in the present embodiment, although having a thin blade cross-sectional shape, fan blade 21 exhibits a behavior like a thick blade as if the blade cross-sectional shape is increased in thickness by the depth of the concave portions 57, 56 at which vortexes (secondary flows) are formed. As a result, the lift produced at fan blade 21 can be significantly increased. In addition, the flection structure of flection portions 41 can improve the strength of fan blade 21. As a result, the reliability in strength of cross-flow fan 10 can be improved.

In cross-flow fan 10 in the present embodiment, concave portion 56 is formed at the blade central portion between inner edge portion 26 and outer edge portion 27. Such a configuration further provides an effect of suppressing separation of airflow produced at the blade central portion. Accordingly, broadband noise generated in cross-flow fan 10 can be effectively suppressed.

In cross-flow fan 10 in the first embodiment of the present invention configured in this manner, the lift produced with rotation of fan blade 21 can be significantly increased in the low Reynolds number region applied to a fan for home electric equipment, etc. Accordingly, power consumption for driving cross-flow fan 10 can be reduced.

In cross-flow fan 10 in the present embodiment, while the strength of fan blade 21 is improved by flection portions 41, the thickness of fan blade 21 can be reduced correspondingly. Accordingly, weight reduction and cost reduction of cross-flow fan 10 can be achieved. Because of the reasons above, cross-flow fan 10 having a blade cross-sectional shape with a high lift-drag ratio, with a small thickness and weight, and with a high strength can be obtained.

In air conditioner 110 in the first embodiment of the present invention, the use of cross-flow fan 10 having an excellent blowing capacity reduces power consumption of a driving motor for driving cross-flow fan 10. Accordingly, it is possible to obtain air conditioner 110 that can contribute to energy savings.

Although an air conditioner has been described by way of example in this embodiment, the cross-flow fan in the present invention is also applicable to a fluid feeding device such as, for example, an air purifier, a humidifier, a cooling device, and a ventilating device.

Second Embodiment

In the present embodiment, a variety of modifications of cross-flow fan 10 in the first embodiment will be described.

Figure 11:
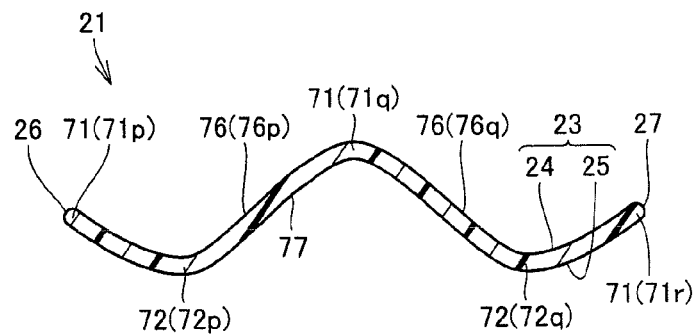
FIG. 11 is a cross-sectional view of a first modification of the cross-flow fan in FIG. 1.

FIG. 11 is a cross-sectional view of a first modification of the cross-flow fan in FIG. 1. Referring to FIG. 11, fan blade 21 has such a blade cross-sectional shape that a concave portion 77 is formed at pressure surface 25 and concave portions 76 are formed at suction surface 24.

A plurality of convex portions 72 (72p, 72q) are further formed at pressure surface 25. Concave portion 77 is formed by a valley portion between the adjacent convex portions 72. In this modification, a plurality of concave portions 76 (76p, 76q) are formed at suction surface 24. A plurality of convex portions 71 (71p, 71q, 71r) are further formed at suction surface 24. Concave portion 76 is formed by a valley portion between the adjacent convex portions 71.

As compared with fan blade 21 in FIG. 3, fan blade 21 has an approximately W-shaped blade cross-sectional shape in which the concave portion and the convex portion are reversed between pressure surface 25 and suction surface 24. In this modification, the number of concave portions 76 formed at suction surface 24 is greater than the number of concave portion 77 formed at pressure surface 25.

It is noted that the number of the concave portions formed at suction surface 24 may be equal to the number of the concave portions formed at pressure surface 25.

Figure 12:
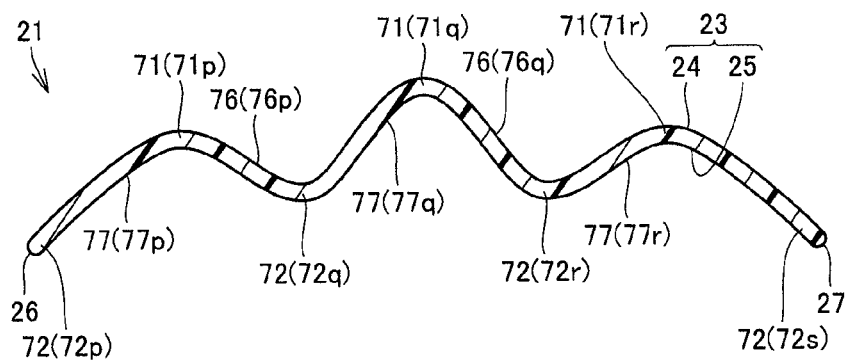
FIG. 12 is a cross-sectional view of a second modification of the cross-flow fan in FIG. 1.

FIG. 12 is a cross-sectional view of a second modification of the cross-flow fan in FIG. 1. Referring to FIG. 12, in this modification, a plurality of concave portions 77 (77p, 77q, 77r) are formed at pressure surface 25. A plurality of convex portions 72 (72p, 72q, 72r, 72s) are further formed at pressure surface 25. Concave portion 77 is formed by a valley portion between the adjacent convex portions 72. A plurality of concave portions 76 (76p, 76q) are formed at suction surface 24. A plurality of convex portions 71 (71p, 71q, 71r) are further formed at suction surface 24. Concave portion 76 is formed by a valley portion between the adjacent convex portions 71.

As shown in this modification, a plurality of concave portions may be formed both at pressure surface 25 and at suction surface 24.

Figure 13:
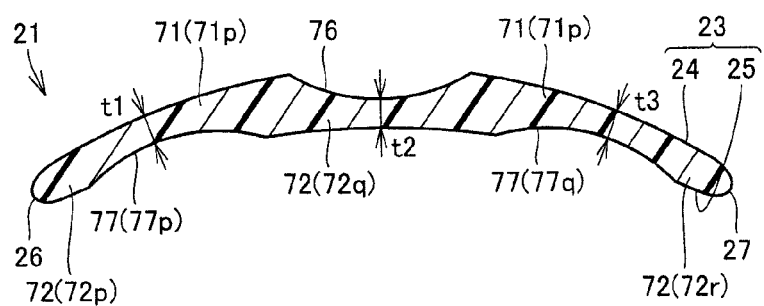
FIG. 13 is a cross-sectional view of a third modification of the cross-flow fan in FIG. 1.

FIG. 13 is a cross-sectional view of a third modification of the cross-flow fan in FIG. 1. Referring to FIG. 13, in this modification, fan blade 21 has such a blade cross-sectional shape as a whole that the thickness is relatively small at positions adjacent to inner edge portion 26 and outer edge portion 27 and the thickness gradually increases as it is closer to the blade central portion between inner edge portion 26 and outer edge portion 27.

Concave portion 77p and concave portion 77q are formed to be positioned in the proximity of inner edge portion 26 and outer edge portion 27, respectively, at pressure surface 25. Concave portion 76 is formed to be positioned at the blade central portion between inner edge portion 26 and outer edge portion 27, at suction surface 24. Concave portions 77 and concave portion 76 are formed to be recessed from the surface of blade surface 23 extending to be curved between inner edge portion 26 and outer edge portion 27. Concave portions 77 and concave portion 76 are formed such that a thickness t1 of fan blade 21 at a position having concave portion 77p, a thickness t2 of fan blade 21 at a position having concave portion 76, and a thickness t3 of fan blade 21 at a position having concave portion 77q are equal.

As shown in this modification by way of example, fan blade 21 is not limited to a structure having a thin cross-sectional shape as a whole but may have any other cross-sectional shape. Fan blade 21 is not limited to a structure in which concave portions 57 and concave portion 56 are formed by flection portions 41 as shown in FIG. 3 but may be structured such that concave portion 76 and concave portions 77 are formed by partially recessing blade surface 23 extending in a flat shape or curved shape as in this modification.

The cross-flow fan in the third embodiment of the present invention configured in this manner can achieve the effect described in the first embodiment, similarly.

Third Embodiment

In the present embodiment, a molding die for use in production of cross-flow fan 10 in FIG. 1 will be described.

Figure 14:
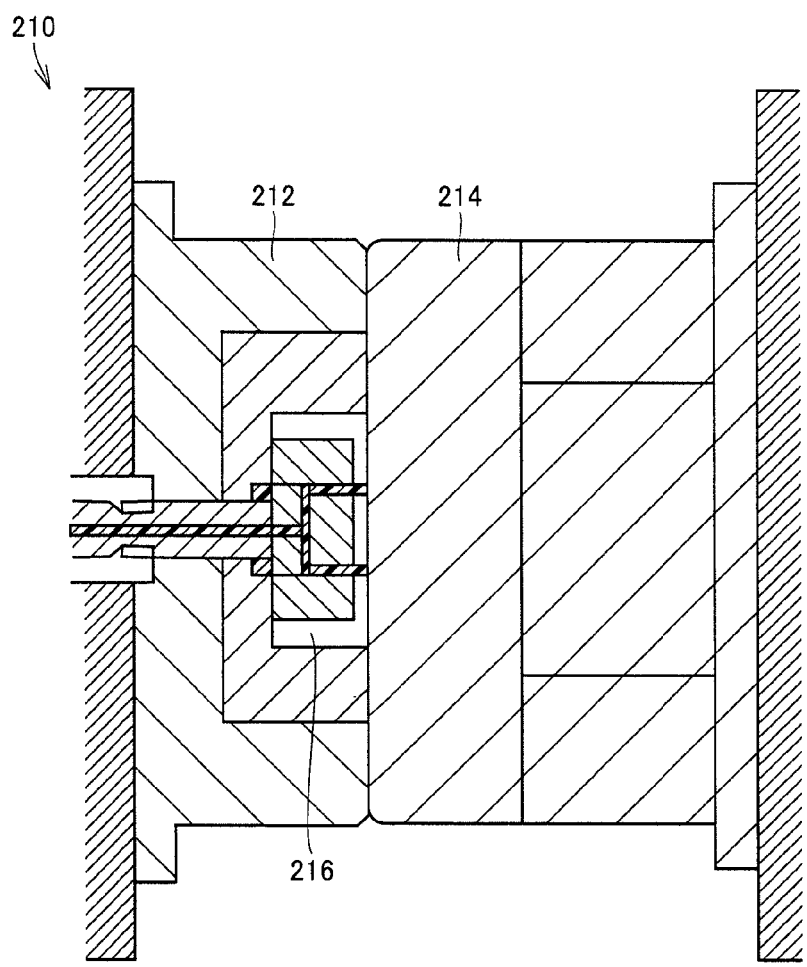
FIG. 14 is a cross-sectional view of a molding die for use in production of the cross-flow fan in FIG. 1.

FIG. 14 is a cross-sectional view of a molding die for use in production of the cross-flow fan in FIG. 1. Referring to FIG. 14, a molding die 210 has a stationary die 214 and a movable die 212. Stationary die 214 and movable die 212 define a cavity 216 which has approximately the same shape as cross-flow fan 10 and into which flowable resin is injected.

Molding die 210 may be provided with a not-shown heater for increasing the flowability of resin injected into cavity 216. The installation of such a heater is particularly effective, for example, when synthetic resin with an increased strength, such as glass-fiber-filled AS resin, is used.

With molding die 210 configured in this manner, a cross-flow fan having a blade cross-sectional shape with a high drag-lift ratio, with a small thickness and weight, and with a high strength can be manufactured by resin molding.

Fourth Embodiment

In the present embodiment, each of cross-flow fan 10 shown in FIG. 1 and a cross-flow fan for comparison having a fan blade without a concave portion and a convex portion formed on blade surface 23 is mounted in air conditioner 110 shown in FIG. 4. Each example carried out using that air conditioner 110 will be described.

In the example described below, cross-flow fan 10 and the cross-flow fan for comparison each having a diameter of 100 mm and a length of 600 mm were used, where the shape including the size and arrangement of fan blade 21 was the same excluding the presence/absence of the concave portion and the convex portion.

Figure 15:
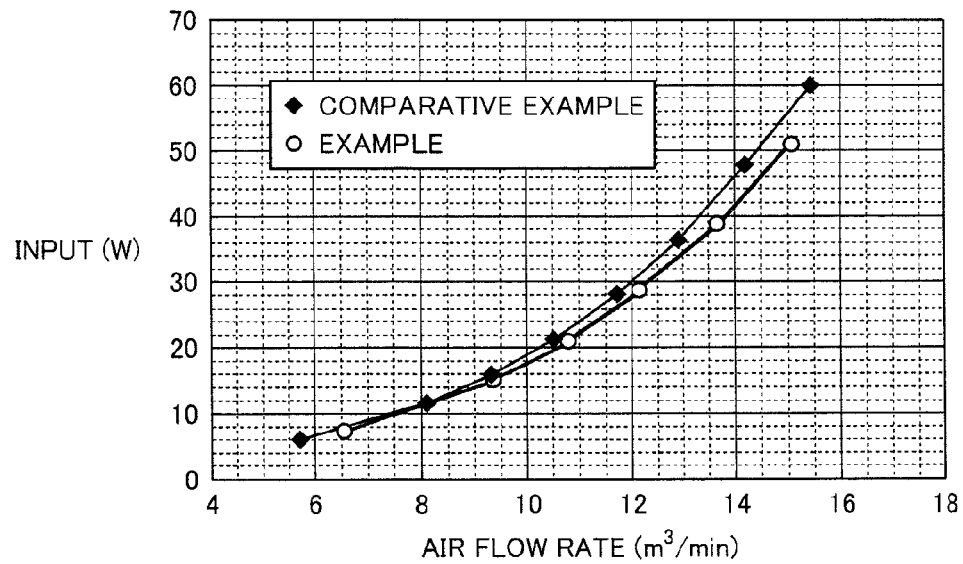
FIG. 15 is a graph showing the relation between the air flow rate of the cross-flow fan and power consumption of a driving motor in an example of the present invention.

FIG. 15 is a graph showing the relation between the air flow rate of the cross-flow fan and the power consumption of a driving motor in the example. Referring to FIG. 15, in the example, the power consumption of the driving motor was measured at various air flow rates, in each of the case using cross-flow fan 10 and the case using the cross-flow fan for comparison. As a result of measurement, it was confirmed that as compared with the cross-flow fan for comparison, cross-flow fan 10 reduced power consumption of the driving motor at the same flow rate.

Figure 16:
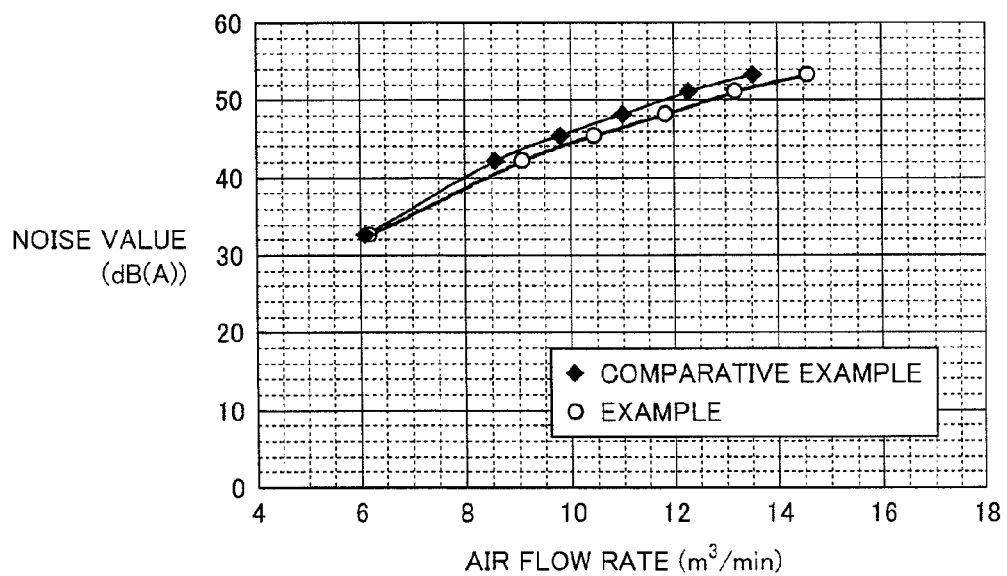
FIG. 16 is a graph showing the relation between the air flow rate of the cross-flow fan and noise value in the example.

FIG. 16 is a graph showing the relation between the air flow rate of the cross-flow fan and noise value in the example. Referring to FIG. 16, in the example, the noise value was measured at various air flow rates, in each of the case using cross-flow fan 10 and the case using the cross-flow fan for comparison. As a result of the measurement, it was confirmed that as compared with the cross-flow fan for comparison, cross-flow fan 10 reduced the noise value at the same flow rate.

Figure 17:
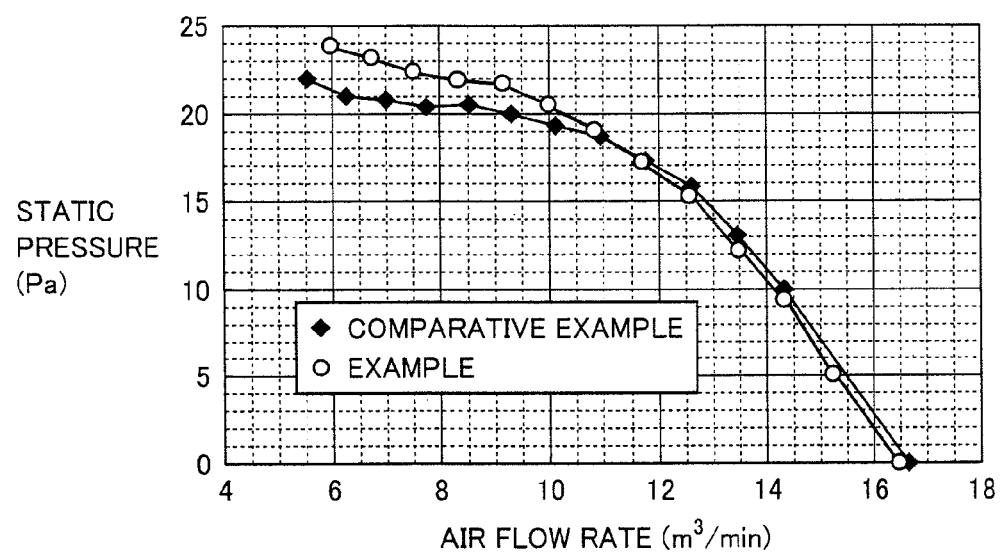
FIG. 17 is a graph showing pressure-flow rate characteristics of the cross-flow fan in the example.

FIG. 17 is a graph showing pressure-flow rate characteristics of the cross-flow fan in the example. Referring to FIG. 17, the figure shows the pressure-flow rate characteristics (P: static pressure-Q: air flow rate) of cross-flow fan 10 and the cross-flow fan for comparison at a constant rotation speed. Referring to FIG. 17, cross-flow fan 10 improved in the P-Q characteristics specifically in a small air flow rate region, as compared with the cross-flow fan for comparison.

The structures of the cross-flow fan as described in the foregoing first and second embodiments may be combined as appropriate to form a new cross-flow fan. The molding die and the fluid feeder described in the first and third embodiments are applicable to a variety of cross-flow fans described in the first and second embodiments and to a cross-flow fan formed of a combination thereof.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

INDUSTRIAL APPLICABILITY

The present invention is mainly applied to home electric equipment having an air blowing function, such as an air purifier and an air conditioner.

REFERENCE SIGNS LIST 10 cross-flow fan, 12, 12A, 12B, impeller, 13 peripheral frame, 13a, 13b end surface, 21 fan blade, 23 blade surface, 24 suction surface, 25 pressure surface, 26 inner edge portion, 27 outer edge portion, 41, 41A, 41B flection portions, 51, 52, 71, 72 convex portion, 56, 57, 76, 77 concave portion, 61, 66, 161 air flow, 62, 63 67, 68, 162 vortex, 101 center axis, 106 center line, 110 air conditioner, 115 blower, 120 indoor unit, 122 casing, 122A cabinet, 122B front panel, 124 intake port, 125 outlet port, 126 air flow channel, 128 air filter, 129 indoor heat exchanger, 131 horizontal louver, 132 vertical louver, 141 upstream region, 142 downstream region, 146 upstream outside space, 147 inside space, 148 downstream outside space, 151 front wall portion, 152 rear wall portion, 153, 154 protrusion portion, 156 upper guide, 157 lower guide, 210 molding die, 212 movable die, 214 stationary die, 216 cavity

The invention claimed is:

1. A cross-flow fan comprising a plurality of vane portions provided to be circumferentially spaced apart from each other, each having an inner edge portion arranged on a radially inner side to/from which air flows in/out and an outer edge portion arranged on a radially outer side to/from which air flows in/out, wherein
said vane portion has a blade surface extending between said inner edge portion and said outer edge portion and including a pressure surface arranged on a rotation direction side of the cross-flow fan and a suction surface arranged on a back side of said pressure surface,
said vane portion has such a blade cross-sectional shape that a concave portion is formed at said pressure surface and said suction surface when said vane portion is cut along a plane orthogonal to a rotation axis of the cross-flow fan,
a plurality of said concave portions are formed at at least one of said pressure surface and said suction surface, and
the number of said concave portions formed at said pressure surface is greater than the number of said concave portions formed at said suction surface.

2. The cross-flow fan according to claim 1, wherein
said vane portion has a flection portion formed by flexing a center line of said blade cross-sectional shape extending between said inner edge portion and said outer edge portion, at a plurality of points, and
said concave portion is formed by said flection portion.

3. The cross-flow fan according to claim 2, wherein said flection portion is flexed such that a depth of said concave portion is larger than a thickness of said vane portion at at least one point.

4. The cross-flow fan according to claim 1, wherein said concave portion is formed in the proximity of said inner edge portion and said outer edge portion.

5. The cross-flow fan according to claim 1, wherein said concave portion is formed at a blade central portion between said inner edge portion and said outer edge portion.

6. The cross-flow fan according to claim 1, wherein said concave portion is formed at said pressure surface and said suction surface to repeatedly appear in a direction in which said inner edge portion is connected with said outer edge portion.

7. The cross-flow fan according to claim 1, wherein said concave portion formed at said pressure surface forms a convex portion at said suction surface, and said concave portion formed at said suction surface forms a convex portion at said pressure surface.

8. The cross-flow fan according to claim 1, wherein
in said blade cross-sectional shape, said concave portion is formed between convex portions appearing at said blade surface, and
said concave portion and said convex portions are formed to be alternately aligned in a direction in which said inner edge portion is connected with said outer edge portion.

9. The cross-flow fan according to claim 1, wherein said vane portion has said blade cross-sectional shape having a generally constant thickness between said inner edge portion and said outer edge portion.

10. The cross-flow fan according to claim 1, wherein said blade cross-sectional shape is approximately W-shaped.

11. The cross-flow fan according to claim 1, wherein the cross-flow fan is made of resin.

12. A fluid feeder comprising a blower configured to include the cross-flow fan of claim 1 and a driving motor coupled to said cross-flow fan to rotate a plurality of said vane portions.

* * * * *